(12) United States Patent
Wright

(10) Patent No.: US 7,562,037 B2
(45) Date of Patent: Jul. 14, 2009

(54) MASS CUSTOMIZATION BILLING ENGINE

(76) Inventor: Carl A. Wright, 7006 Suncrest Dr., Saline, MI (US) 48176

( * ) Notice: Subject to any disclaimer, the term of this patent is extended or adjusted under 35 U.S.C. 154(b) by 1567 days.

(21) Appl. No.: 09/766,934

(22) Filed: Jan. 22, 2001

(65) Prior Publication Data

US 2002/0010666 A1 Jan. 24, 2002

Related U.S. Application Data

(60) Provisional application No. 60/177,474, filed on Jan. 21, 2000.

(51) Int. Cl.
*G07F 19/00* (2006.01)

(52) U.S. Cl. .............................. 705/34; 705/26; 705/39; 705/40; 707/1; 379/114.28; 709/223; 715/505; 715/536

(58) Field of Classification Search ................... 705/26, 705/40, 39, 34; 709/223; 715/505, 536; 707/1; 704/8; 379/114.28
See application file for complete search history.

(56) References Cited

U.S. PATENT DOCUMENTS

| | | | |
|---|---|---|---|
| 5,963,925 A * | 10/1999 | Kolling et al. ................. | 705/40 |
| 6,002,754 A * | 12/1999 | Jaiswal et al. .......... | 379/114.28 |
| 6,070,150 A * | 5/2000 | Remington et al. ........... | 705/34 |
| 6,282,552 B1 * | 8/2001 | Thompson et al. .......... | 715/505 |
| 6,292,789 B1 * | 9/2001 | Schutzer ...................... | 705/40 |
| 6,304,857 B1 * | 10/2001 | Heindel et al. ................ | 705/34 |
| 6,418,467 B1 * | 7/2002 | Schweitzer et al. ......... | 709/223 |
| 6,493,685 B1 * | 12/2002 | Ensel et al. .................... | 705/40 |
| 6,904,401 B1 * | 6/2005 | Hauduc et al. ................. | 704/8 |
| 2001/0009002 A1 * | 7/2001 | Logan et al. ................... | 705/34 |
| 2001/0014878 A1 * | 8/2001 | Mitra et al. .................... | 705/39 |
| 2002/0065772 A1 * | 5/2002 | Saliba et al. .................. | 705/40 |
| 2002/0111933 A1 * | 8/2002 | Noble et al. .................... | 707/1 |
| 2003/0140316 A1 * | 7/2003 | Lakritz ........................ | 715/536 |
| 2003/0191701 A1 * | 10/2003 | Haseltine et al. .............. | 705/34 |

FOREIGN PATENT DOCUMENTS

| EP | 590332 A | * | 4/1994 |
|---|---|---|---|
| JP | 1105460 A | * | 4/1999 |

OTHER PUBLICATIONS

Dalton, Gregory, "E-Billag arrive"; Information week; Apr. 19, 1999, Iss. 730; p. 18, 2 pgs, extracted from proquest database on Internet on Apr. 29, 2004.*

Press release, "Oracle announces Oracle Internet Bill & Pay 1.0, a Robust and Comprehensive Electronic Bill Presentment & Payment Solution"; PR Newswire; New York; Dec. 2, 1998; p. 1, extracted from proquest database on Internet on Apr. 29, 2004.*

* cited by examiner

*Primary Examiner*—Yogesh C Garg
(74) *Attorney, Agent, or Firm*—Gifford, Krass, Sprinkle, Anderson & Citkowski, P.C.

(57) ABSTRACT

A system and method for the mass customization of bills or invoices particularized to each client's preference is provided. The present invention is used to permit a provider of mass customization billing service to customize invoice/bill formats, layouts, and contents for service organizations as well as recipients of those services. Under the system and method of the present art, the invoice generation process is driven by a set of format specifications customized to an individual account or client. Accordingly, the system and method of the invention is ideal for customers and clients that require particularized styles, formats, or information content relevant to invoices.

7 Claims, 12 Drawing Sheets

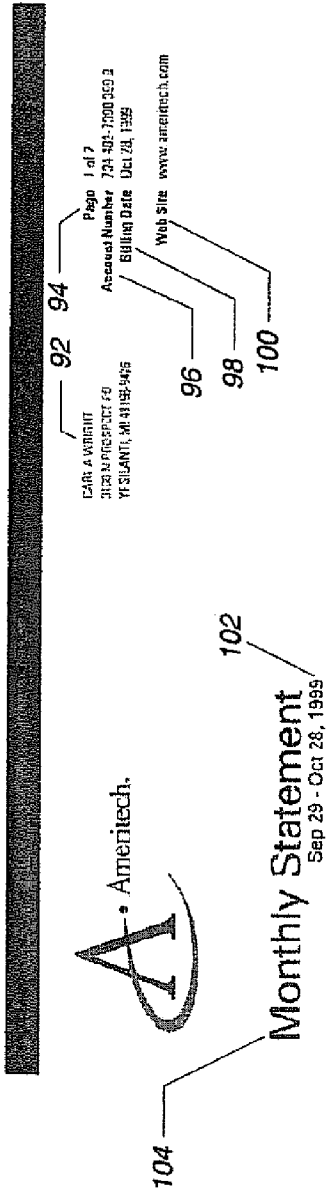

Fig - 6B

| | | |
|---|---|---|
| 126 | Bill-At-A-Glance | |
| 106 | Previous Bill | $18.96CR |
| 108 | Payment - Thank You | $18.96 |
| 110 | Adjustments | .00 |
| 112 | Balance | .00 |
| 114 | Current Charges | 22.18 |
| 116 | Total Amount Due | $22.18 |
| 118 | Amount Due in Full By | Nov. 19, 1999 |

Ameritech Local Service —— 126

Monthly Service - Oct 28 thru Nov 27
| | |
|---|---|
| Call Plan 50 | 10.75 |
| Adjacent Exch Toll Offset Chrg | .02 |
| Zone Service | 1.63 |
| Federal Access Charge | 3.50 |
| State Access Charge | 3.23 |

⎬ 132

Total Monthly Service   19.24 —— 134

Other Charges and Credits
This section of your bill reflects charges and credits resulting from account activity.

⎬ 136

| Item No. | Description | Quantity | Monthly Charges |
|---|---|---|---|
| | Effective Oct 6, 1999, your Bill reflects a decrease of $.04 in your Monthly Service charges. Charges are prorated from Oct 6, 1999 thru Oct 27, 1999 | | |
| 1 | Monthly Service | | .03CR |

⎬ 138

| | | | |
|---|---|---|---|
| | (Monthly Charges are Prorated from Oct 25, 1999 to your Billing Date, Oct 28, 1999) Effective Oct 25, 1999, your Bill reflects an increase of $1.83 in your Monthly Service charges. Charges are prorated from Oct 25, 1999 thru Oct 27, 1999 | | |
| 2 | Monthly Service | | .18 |

⎬ 140

Total Other Charges and Credits —— 144   .15 —— 142

Local, State and Federal Charges
| | |
|---|---|
| 9-1-1 Emergency System | .26 |
| Emergency 9-1-1 Operational Assessment | .50 |
| Number Portability Surcharge | .24 |

⎬ 146

Total Local, State and Federal Charges   1.00 —— 148

Taxes 150
| | |
|---|---|
| Federal at 3% | .60 |
| State at 6% | 1.19 |

⎬ 152

Total Taxes   1.79 —— 154

Total Ameritech Local Service Charges   22.18 —— 156

Total Basic Local Exchange Service and regulated long distance was $10.75. This is not an additional charge. Ameritech is required to display this information. —— 124

MASS CUSTOMIZATION BILLING ENGINE

REFERENCE TO RELATED APPLICATION

This application claims priority of U.S. provisional patent application Ser. No. 60/177,474, filed Jan. 21, 2000, the entire contents of which is incorporated herein by reference.

FIELD OF THE INVENTION

The present invention relates generally to billing services; and, more particularly, to an automated method and system for the production of invoices, each invoice individually customized according to the preferences of the customer or client. The production capabilities found under the present invention include mass production, single invoice production, batch processing, or ad hoc processing.

BACKGROUND OF THE INVENTION

Current art provides methods and systems for the mass production of billing related to service or client accounts. Under the mass production method of billing, all invoices for a plurality of accounts are generated and printed according to a predefined format. Thus, all the invoices contain the same fields of information, as well as the same layout of the fields on each page. The mass-produced invoices differ only with regard to the information content of each field.

The methods of the current art, however, fail to provide billing or account services particularized to a set of preferences. For example, a client may want specific fields of information that are not included under a general format to appear on the bill, or may prefer to have the information content displayed according to a particular layout.

In light of the foregoing, then, it is desirable to provide a system and process to generate customized bills. The generation process should incorporate the functionality to mass-produce customized bills for a large market segment as well as provide responsive billing information pursuant to ad hoc requests. It is also desirable to provide such a system and method that is easily implemented or easily integrated with existing systems provided by service companies or other entities having large client bases.

SUMMARY OF THE INVENTION

The present invention addresses the shortcomings of the current art with an automated system and method that permits a provider of the same (hereafter, the provider) to customize invoice and bill formats as well as their contents for service organizations (hereafter, customers) or recipients of services (hereafter, clients). Under the system and method of the present art, a format customized to an individual account or client drives the invoice-generation process. This format consists of a plurality of invoice specification software objects that "pull" information on to the output page from other sources of data. Each specification software object acts as a machine to generate its goal output. A structured grouping of these objects working together generate the goal output, e.g. a telephone bill. Accordingly, the system and method of the invention is ideal for customers and clients that require particularized styles, formats, or information content relevant to invoices.

A prime example of an environment employing the system and method of the present invention is illustrated in the context of a large telephone company (customer) that provides local and long distance telephone services, cable services, telephone-related repair services and the like to a multitude of persons (clients). On behalf of the customer, the provider generates a monthly telephone bill for each client. The customer, the client, or both direct the format of the monthly telephone bill, while the content of the telephone bill is derived from client activities, taxing regulations, rates, and the like.

Preferably, the method of the present invention includes the steps of selecting a client for whom a bill is to be produced; extracting the previously defined invoice specifications (hereafter, a bill format) having specific fields for the selected customer; collecting data pertinent to the customer and to the specific fields in the bill format; correlating the collected data with the specific fields in the bill format; and producing the bill having the defined bill format, the specific fields, and the data correlated thereto.

In the first step, a customer, client, or client account is selected or identified. The selection process contemplates various means. For example, the customer account may be identified during a batch processing operation conducted via software and a database; via a customer inquiry; or electronically received from a customer providing services to numerous clients.

Once a customer is selected, the bill format for the client is extracted from a store of invoice specifications. The format may include various fields or categories of information, for example, client address, client account status, and amount of previous bill.

Data pertinent to the client and to the various fields of information selected for the bill are collected from various sources by invoking "get-data" methods of the invoice specification software objects. The sources include, for example, the service provider of the client; i.e., the customer; a repository or database of the customer; and various servers and software applications associated with the provider.

After the data are collected, the data are processed and formatted to the selected fields in the output bill format. Portions of the data may be utilized in more than one selected field. Client usage of services data, for example, may be displayed in both a detailed transaction field and a summary transaction field.

The processing of the data by an invoice specification object may also manufacture additional invoice specification objects that must also have their "get-data" methods invoked. Each of these "get-data" methods returns a success or failure signal. Certain objects must wait until other objects have been successful before they can be successful. These objects return failure until those that must complete first have been successful. An example is an object that pulls the value of other invoice specification objects to create a total value for its content.

On completion of the processing of all of the invoice specification objects such that their "get-data" methods are invoked and those methods have returned a success signal, an invoice or bill is produced by invoking the "output-thyself" methods of the invoice specification objects. The bill contains the predefined format, the predetermined fields, and the data correlated to the appropriate field. The predefined format may include, for example, a specific layout or segmentation of the pages of the bill. The predetermined fields may be so designated with appropriate headings, titles, design insignia, or the like. The data generally appears in proximity to its correlated field. Any method of production is acceptable so long as it satisfies the functionality described herein. It is contemplated that the methods of production include computer-generation, printing operations, Internet web page generation, and the like. Various embodiments of bills include computer-generated displays(remote and local), printed material, and the like.

The foregoing examples represent several of the embodiments of the present invention; however, one skilled in the art will recognize that the examples in no way limit the invention disclosed herein.

BRIEF DESCRIPTION OF THE DRAWINGS

Figure 6F:
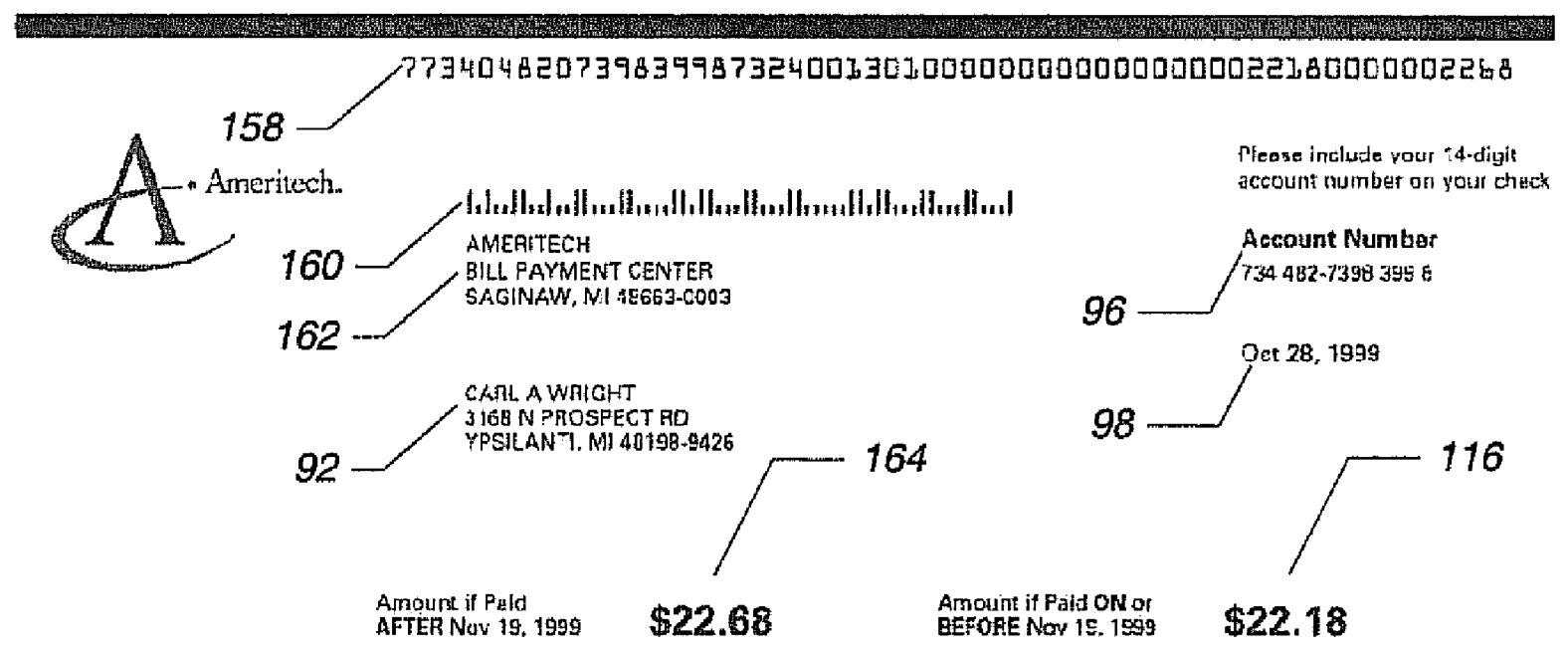

FIG. 6A is a detail drawing showing the upper section of the Statement of FIG. 6:

FIG. 6B is a detail drawing showing the Bill-At-A-Glance section of the Statement of FIG. 6;

FIG. 6D is a detail drawing showing the Ameritech Local Service section of the Statement of FIG. 6;

FIG. 6E is a detail drawing showing the "News You Can Use" section of the Statement of FIG. 6;

FIG. 6F is a detail drawing showing the bottom section of the Statement of FIG. 6.

DETAILED DESCRIPTION OF THE PREFFERRED EMBODIMENT

In accordance with the present invention, the preferred embodiment of the mass customization bill engine provides for the design of the format and layout of bills or invoices (hereafter, the bill image) according to a customer's or a client's preference and according to the needs of smaller and smaller market segments. After customization of the bill formats and their assignment to customers/clients, bills for a plurality of market segments are mass-customized. Each bill image mirrors the predetermined bill format and contains information pertinent to a client and appropriate for each category in the predetermined bill format. The preferred embodiment also performs the rating, taxing, and most of the generation of the bill content.

Typically, the preferred method utilizes an automated system having at least one software component, a data repository, and an output device. It is contemplated that the system utilized by the preferred method functions independently of any one hardware or operating system platform. For example, the system configuration comprises one or more Intel-based processors, the Windows NT® operating system, as well as Microsoft SQL® and Vertex or other tax database and software components. The automated system is compatible with the Unicode alphabet, thereby supporting native languages of a plurality of countries.

The preferred method may be implemented and utilized in a local, expanded, or global computing environment and coexists with existing customer processing systems. It is contemplated that the present invention serves a wide industry base, including companies having local, regional, national, and/or international interests; e.g., a large telecommunications companies. For example, the system might provide billing customization services for a large, wireline carrier based in the United States. The carrier extracts computer records from an existing data flow process, processes the computer records into Invoice Ready EMI records, and then delivers the EMI records to the existing billing process for formatting and other billing processing. Thus, the carrier can utilize their existing client care software while introducing new billing formats and plan flexibility.

Figure 1:
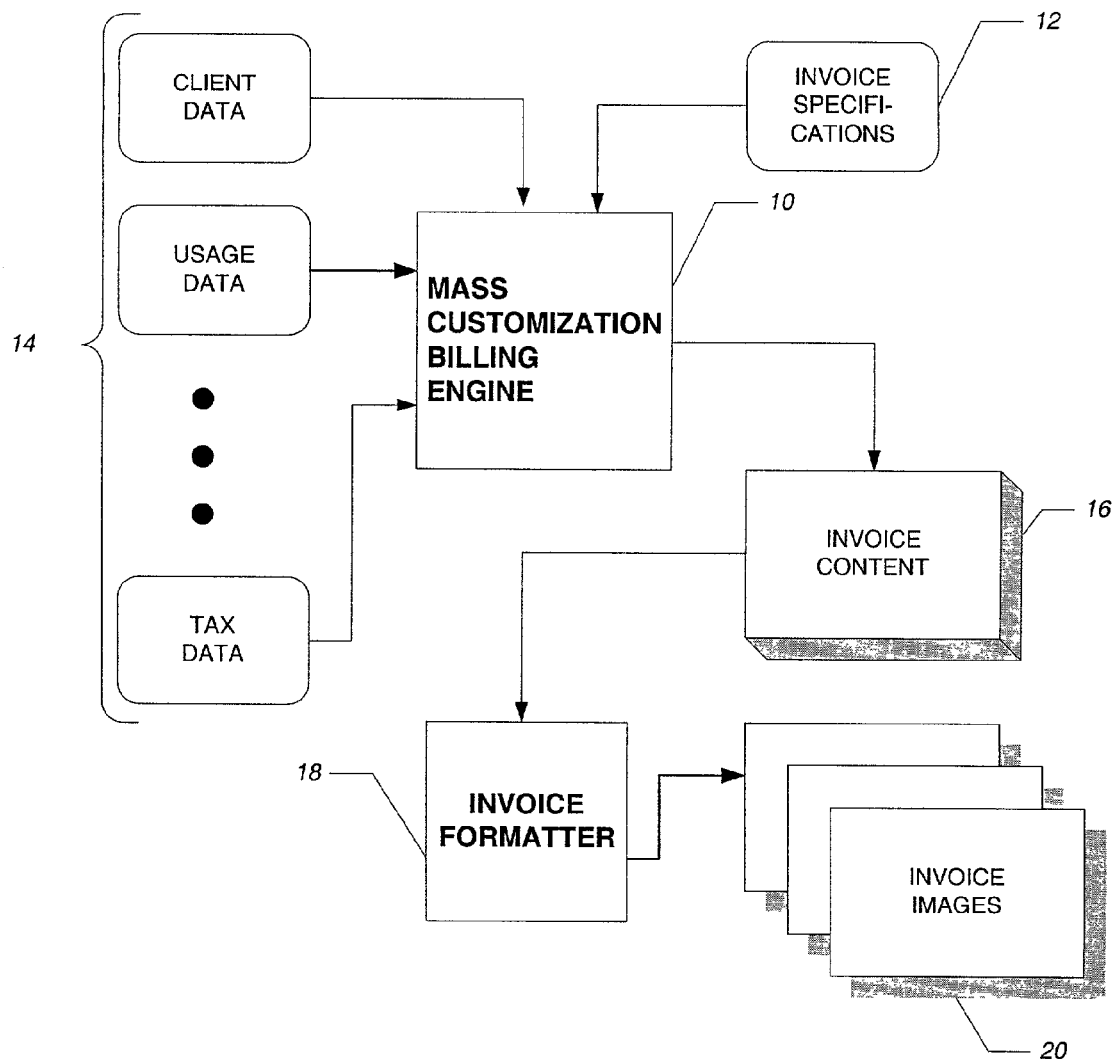
FIG. 1 illustrates a schematic view of a preferred embodiment of the mass customization engine according to the present invention.

Referring now to the drawings wherein like numbers are used to denote like items throughout, there is shown in FIG. 1 a schematic view of a preferred embodiment of the mass customization engine according to the present invention. Typically, the mass customization billing engine 10 receives in a set of invoice specifications 12. The mass customization billing engine 10 processes the invoice specification software objects 12 to determine data required for production of an invoice. The invoked invoice specification objects 12 then pull the data 14 from various sources. The sources of data include, for example, categories of data related to usage transactions, recurring charges from the client assigned service plan, tax databases, usage rating database, one-time charges associated with the client account, debits or credits to correct errors, customer account payment and balance information, etc.

The mass customization billing engine 10 invokes methods in the invoice specification software objects that process the data 14 according to determine the invoice content 16 appropriate for the invoice to be produced. The invoice formatter 18 receives and formats the invoice content arranging the content to fit paging requirements, and generates one or more invoice images 20 based on the formatted invoice content.

Figure 2:
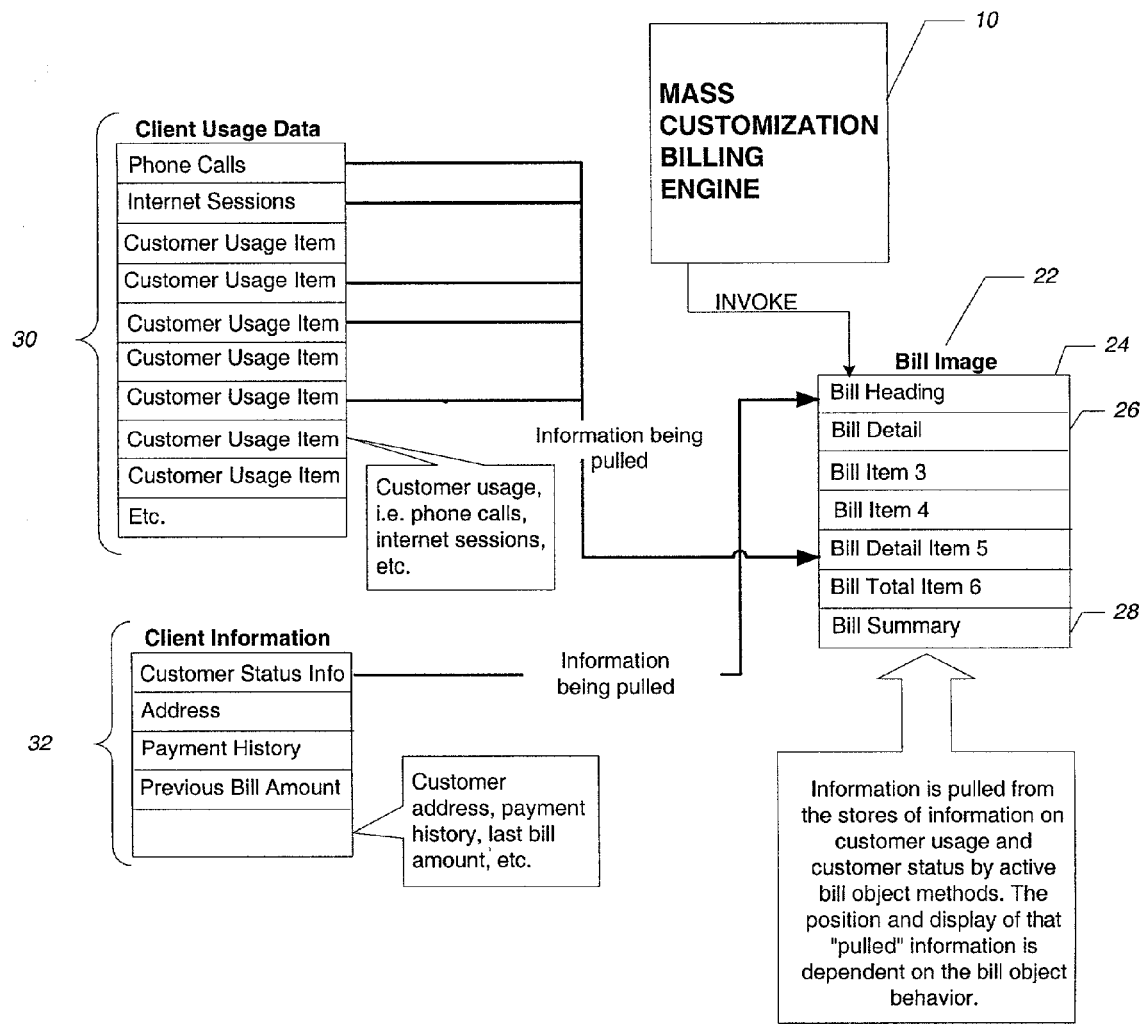
FIG. 2 illustrates a schematic view of the mass customization billing engine pulling data onto the bill image.

The invoice specification objects 12, or "bill format", drive the bill production process, and the mass customization engine 10 invokes the specification object methods that pull the data for display on a bill according to the bill format. The foregoing concept is exemplified in FIG. 2, where a schematic view of the mass customization billing engine 10 pulling data onto a bill image is illustrated. In FIG. 2, the mass customization billing engine 10 has received in an invoice specification 12 that calls for the following fields: a bill heading, bill detail, and a bill summary. Accordingly, the mass customization billing engine 10 must ultimately produce a bill image 22 (or invoice image 20) having a section for a bill heading 24, bill detail 26, and a bill summary 28.

To produce the bill image 22, the mass customization billing engine 10 invokes methods of the invoice specification software objects that retrieve data 14 related to the specified fields. The sources include storage repositories such as databases having client usage data 30 and client information 32. The client usage data 30 includes, for example, an itemization of all phone calls placed during a particular time interval for a particular client or all Internet sessions established and completed during a specified time interval.

After gathering the data 14 by invoking the "get-data" methods of the invoice specification objects, the mass customization billing engine 10 correlates the data 14 to the specified fields for the bill heading 24, the bill detail 26, and the bill summary 28. Such a correlation event might establish, for example, a relationship between the client information 32 and the bill heading 24, wherein the relationship is predicated on the address data of the client. Other relationships between data objects and fields in this example include the client usage data 30 and the bill detail 26 predicated on, for example, the phone calls. The client usage data 32 and client information 32 both correlated to the bill summary by virtue of the phone calls, Internet sessions and previous bill amount.

Figure 3:
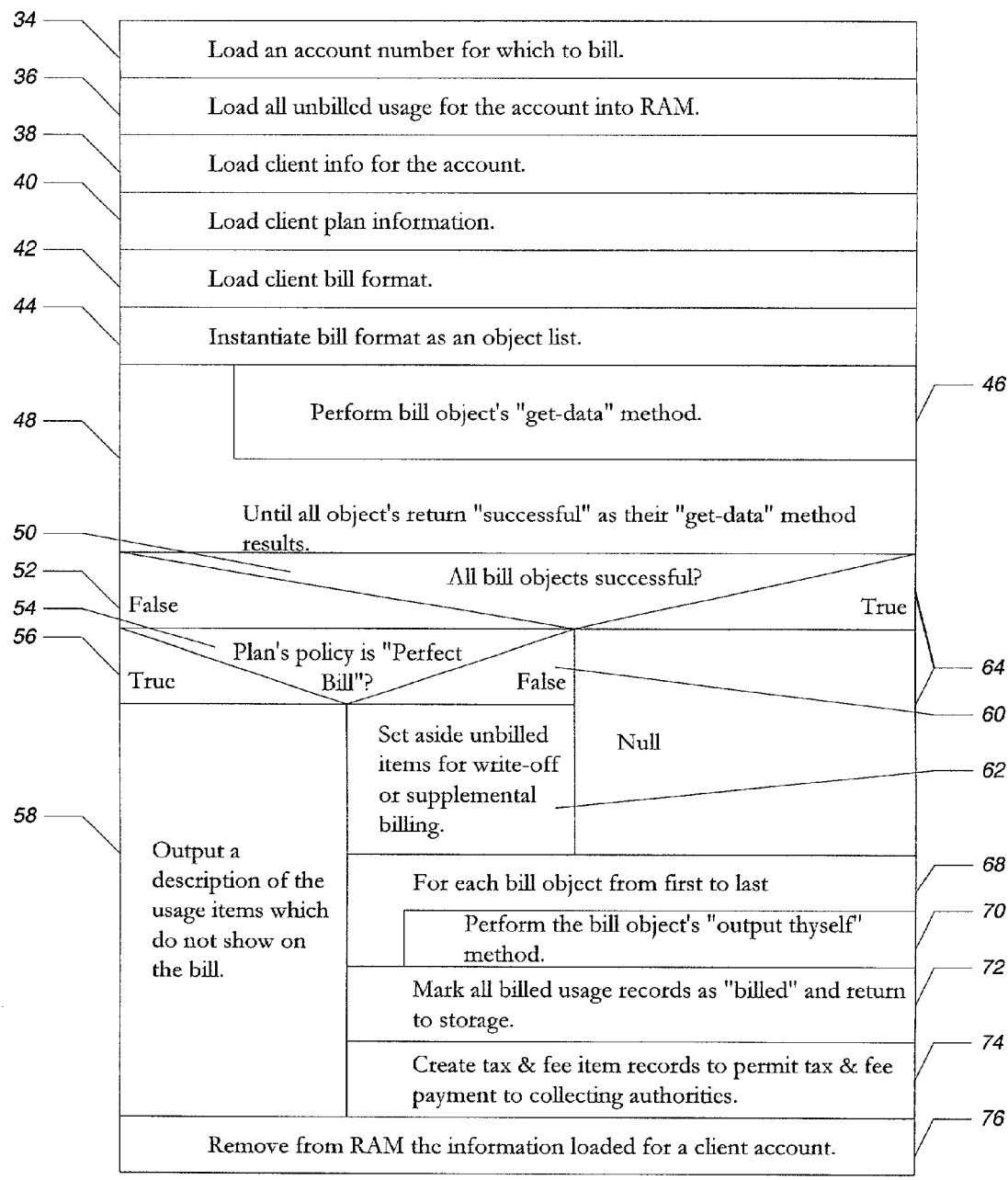
FIG. 3 illustrates a diagrammatic view of detail-level process steps according to the present invention.

A detail-level flowchart of the processing step associated with the mass customization billing engine 10 is illustrated in FIG. 3. Initially, the system loads an client account for which to bill 34; loads all unbilled usage for the client account into memory (RAM) 36; as well as client information for the client account 38; client plan information 40; and a client bill format (invoice specification software objects) 42. Thereafter, the system instantiates the bill format as an object list 44; i.e., a list of format objects wherein each format object represents or is associated with a plurality of fields designated on the bill format. The system performs a process to create the required content objects; i.e., objects associated or required on the bill 46 until all the content objects have been created, invoke their "get-data" method, and return "success" as their process method result response 48. The system then checks to determine if all objects are successful 50. If not all are successful 52, then the system checks to determine if the plan's policy requires a "perfect bill" 54. When all objects are successful, you have a "perfect bill". If a perfect bill is required 56, then a description of the usage items that do not show on the bill is output 58. If the plan's policy does not require a "perfect bill" 60, then the system sets aside the unbilled items for write-off or supplemental billing 52. If all usage and service items are billed 64, then the system, for each bill object 68, performs the bill object's output method 70. Once completed, the systems marks all billed usage records as "billed" and returns the billed usage records to storage 72. The system creates tax and fee items records to permit tax and fee payment to collecting authorities 74, then removes from RAM the information loaded for the client account 76.

Figure 4:
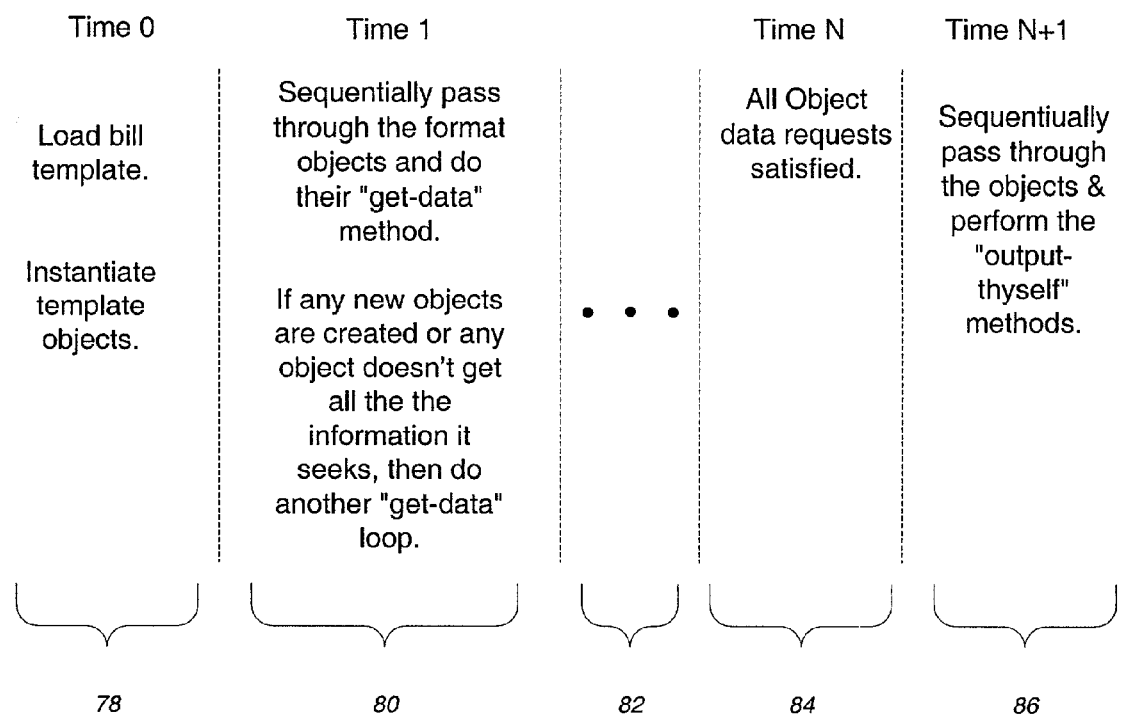
FIG. 4 illustrates a diagrammatic view of high-level object process steps according to the present invention.

In FIG. 4, there is shown a diagrammatic view of high-level object process steps according to the present invention. The high-level object process steps are shown with reference to a timeline having Time 0 78, Time 1 80, a variable number of time intervals 82, Time N 84 and Time N+1 86. Initially, at Time 0 78, the system receives a bill format(invoice specification software objects) having a specific format or fields. The system instantiates the format objects; i.e., modules or routines designated to locate and retrieve data that satisfy the requirements of the bill format.

At Time 1 80, the system sequentially passes through the format objects, each of which attempts to retrieve the data 14 associated therewith; i.e., a "get-data" method. The get-data method may gather data 14 from a repository or database containing client account transactional information. The get-data method may create additional peer or subordinate format objects. If new format objects are created or any format object fails to retrieve all the data 14 associated therewith, then the system repeats an iteration of the step described at Time 1 80. Any repeated iterations of the step described at Time 1 80 occur during the variable number of time intervals 82.

At Time N 84, all format object data requests are satisfied, whereafter at Time N+1 86 the system sequentially passes through the format objects to perform an output method ("output-thyself") in preparation for the transfer of data 14; i.e., content objects, to a bill image 22. Content objects typically have hierarchy, can query other content objects for information, and can create other contents objects.

Figure 5:
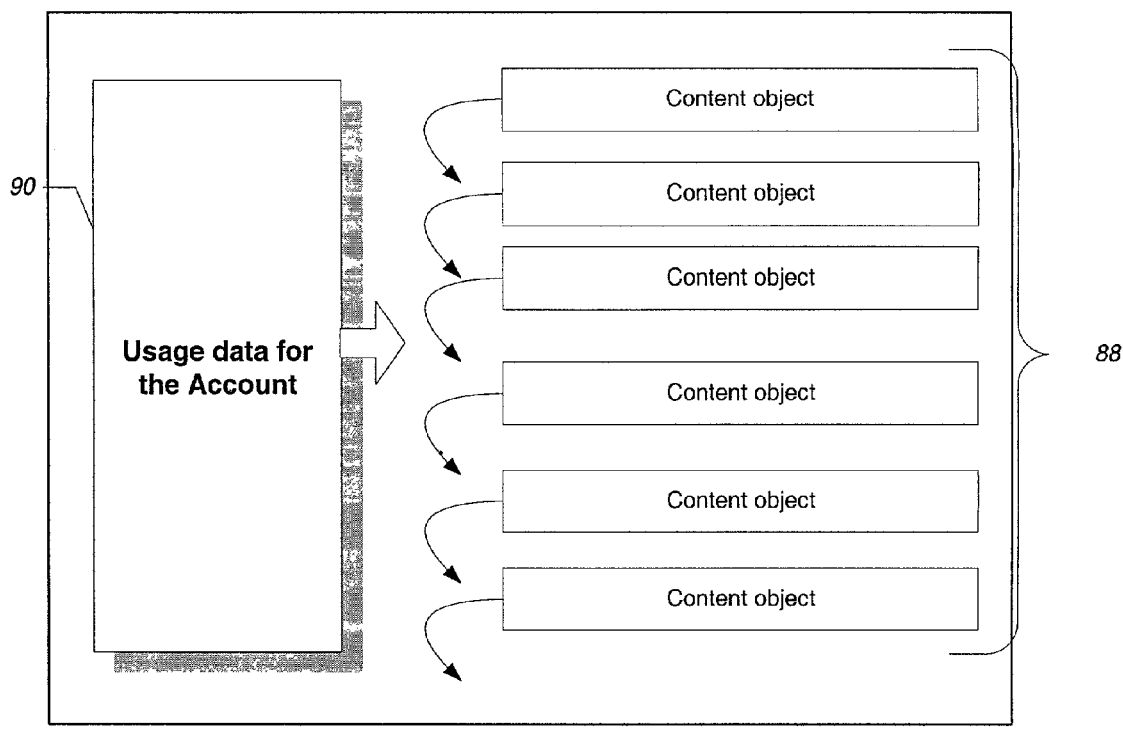
FIG. 5 illustrates a schematic of content objects associated with the present invention.
Figure 6:
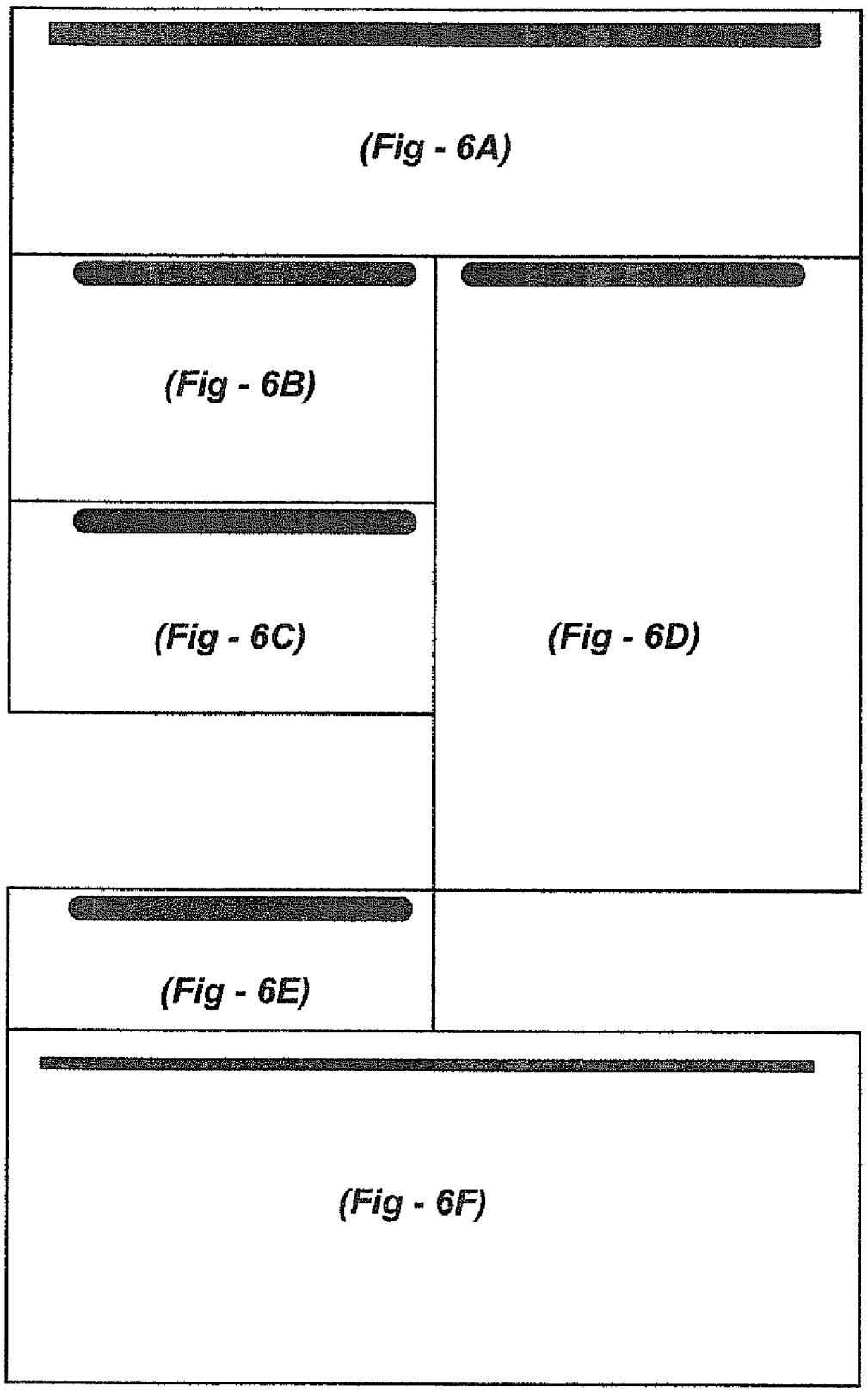
FIG. 6 is a map showing the way in which particular sections are arranged on a Monthly Statement.
Figure 6C:
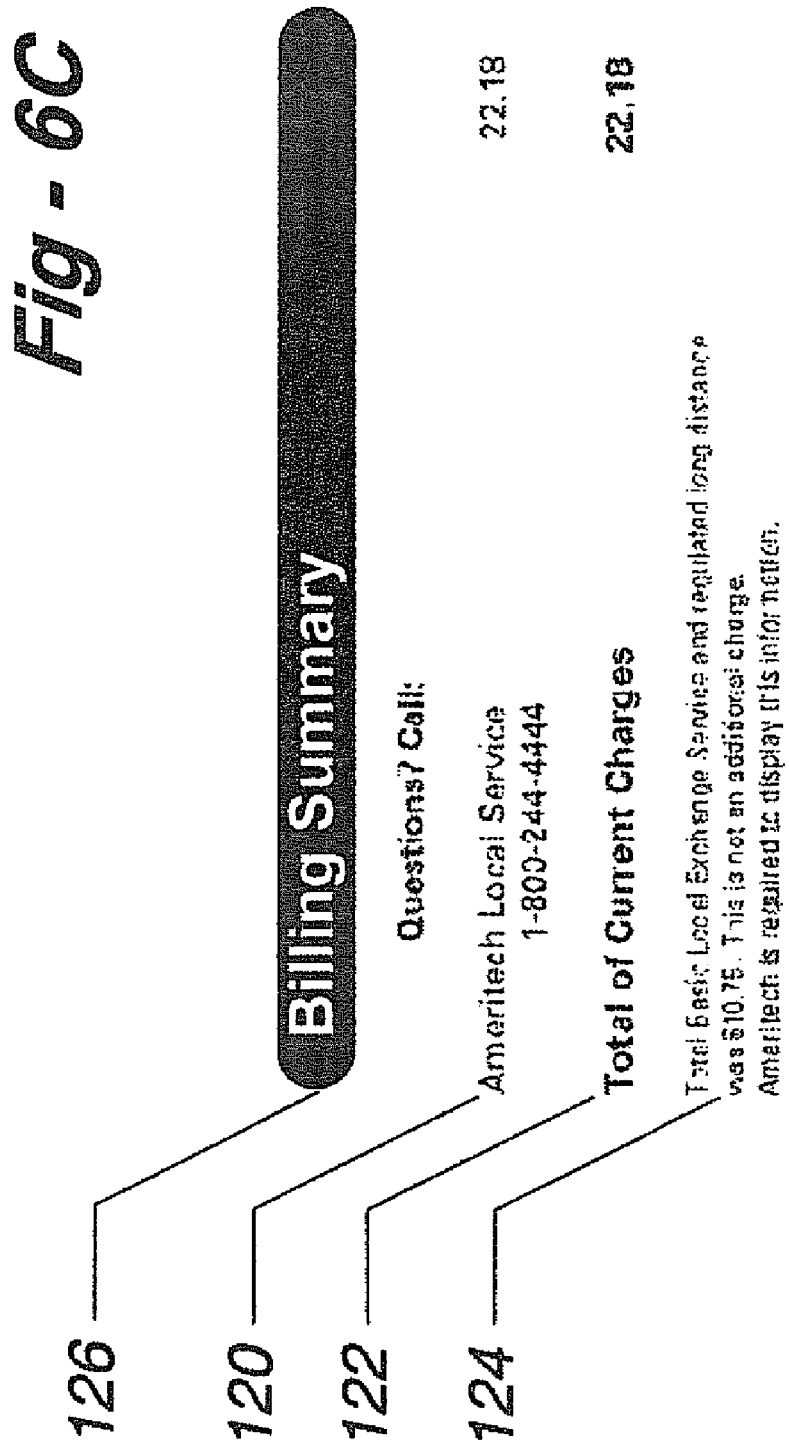
FIG. 6C is a detail drawing showing the Billing Summary section of the Statement of FIG. 6.
Figure 6G:
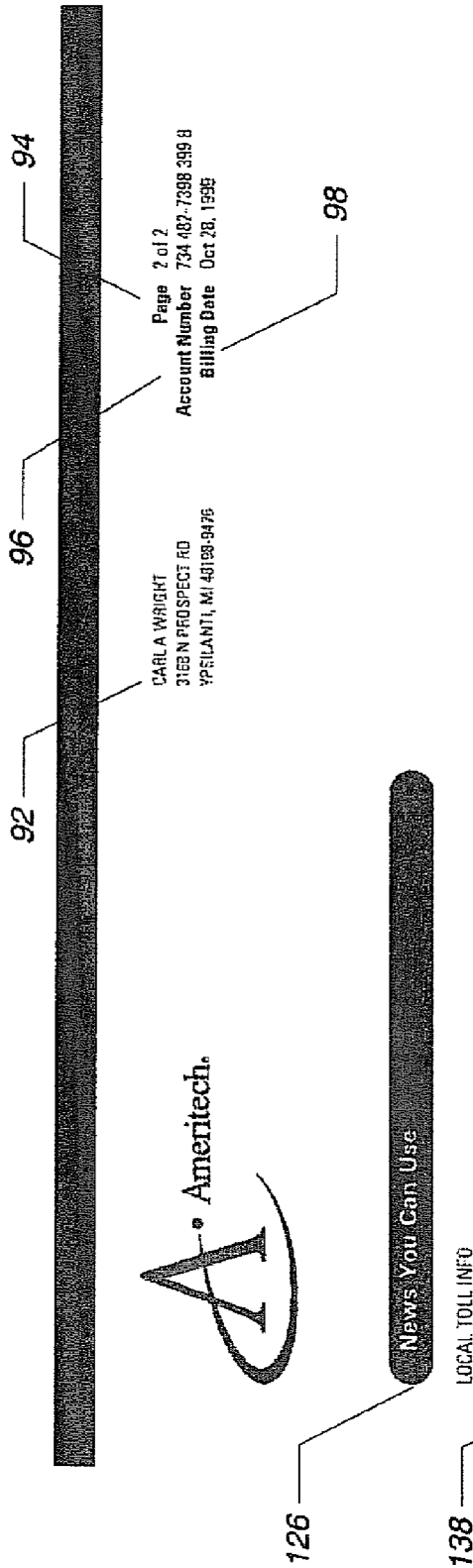
FIG. 6G is a detail drawing showing the back side of the Statement of FIG. 6.

Turning now to FIG. 5, there is shown a schematic of content objects associated with the present invention. In various embodiments, the system utilizes a chain of content objects 88 located in RAM to represent the bill information. The system derives the chain of content objects 88 from the bill format that gathers the usage data 90 and other billing data pertinent to a client. Examples of content objects include text content objects, heading content objects, first level total content objects, detail content objects, tax nexus objects, and tax calculation objects. The text content objects generally comprise output information with fixed text content. The heading content objects generally comprise output information for columnar headings or an accompaniment for a group of displayed detail objects, such as itemized phone calls. The first level total content objects include a total value figure for each associated group of detail objects. The total value figure pulls into itself the total values of a plurality of first level total content objects. The value of the group of detail objects may or may not be displayed on the bill image 22 according to the needs of the bill format processing. The detail content objects gather and represent a detail usage event. The tax nexus objects identify the taxing jurisdictions and services applicable to the client account and generate tax calculation objects. The tax calculation objects calculate the tax relevant to a client account.

It is contemplated that the method of the preferred embodiment culminates with the production of a plurality of content objects, which may be further processed and displayed as output on a bill image 22 or the like. An example of the same is illustrated in FIGS. 6A through 6G, where there is shown a sample single line residential telephone bill. The system pulled all data 14 from the sources of data that include customer information, customer plan information, bill cycle information, tax list, and carrier information. The system generated the bill image 22 embodied as a single line residential telephone bill in accordance with invoice specifications 12 containing the fields of (and shown on the single line residential bill as) the following: client address 92 wherein the data is obtained from a field stored in with the customer information data. The address format is customized to the nation in which the billing is received. Address format vary by country. For example, in Mexico, the address includes a "colonia" in addition to a city and puts the number for the address after the street name. The page number field 94 results from a placeholder function run by the mass customization billing engine 10, with bill formatter software inserting the actual number. The account number 96 is pulled from the customer information data, as is the billing date 98. The billing date 98 information may also be pulled from the bill cycle information. Typically, most North American telephone service clients are billed monthly; however, the method and system of the present invention accommodate billing cycles of various lengths. The website 100 information is also pulled from the bill cycle information. By parameterizing this, bills can be generated for resellers during the same process run used for direct customers or clients.

The bill cycle inclusive dates field 102 is pulled from the bill cycle information and represents the period for the bill cycle. The bill may contain charges for services provided prior to the current bill cycle, but not yet billed on previous bills. An example of this includes a credit card call from another carrier. The bill may also contain charges billed in advance of the time period in which the service is rendered. The description of the bill period 104 is pulled from the bill cycle information, while the previous bill amount 106 and the payment amount 108 are pulled from customer information. The payment amount 108 represents the total amount of payment credited to the client account during the previous billing cycle. The adjustment amount 110 is pulled from the customer information and represents the total amount of adjustments to the account since the last bill. Examples of adjustments to a client account include calls that were removed from a previous bill for the reason of "call not made by client"

and credits from long distance carriers. The balance 112 is a mathematical total of the previous bill, payment and adjustment amounts, pulled from other parts of the bill. The current charges 114 are a total of all the charges on the present bill pulled from other portions of the bill. The total amount due 116 is the mathematical total of the balance due and the current charges pulled from other parts of the bill. The amount due in full by date 118 represents the results of the carrier's payment policy for the client's service plan that totals charge information from other portions of this bill. The local service contact information and charges 120 informs clients with questions where to call is pulled from the portion of the bill that relates to the local service carrier. The total charge for the entire bill 122 is the mathematical total of all charges on the present bill pulled from other portions of the bill. The partitioned charges; i.e., the local service contact information and charges and the total charge for the entire bill 122 are displayed as separate items to accommodate billing models where one carrier bills and collects for itself and other carriers. The governmental text message 124 relates predetermined information to the client; e.g., required governmental information.

The section heading 126 group highlights various sections (fields) of information. Fixed text 128 is generally displayed for a specific bill carrier, and generally not displayed if the bill is produced for a reseller. The subheadings 130 are provided for subsections of the bill pulled from the bill cycle information. The monthly charge items 132 are pulled from the customer plan information; e.g., fees charged in advance. The monthly charge items 132 for most telephone companies are associated with the Universal Service Order Codes (USOC). In the sample single line residential bill, only one of each charge is billed. If the client account included multiple telephone lines, then several charges would be shown. The total fee items amount 134 is a subsection total (first level total content object) amount for the monthly charge items 132. The heading lines 136 label the other charges and credits section. Generally, the heading lines 136 are optional; i.e., the heading lines 136 appear on bills only if there are detail charges or credits to show on the bill. The detail credits 138 are pulled from the monthly local, state, and federal charges. For example, as illustrated, the local number portability charge dropped from 28 cents to 24 cents during the current monthly billing cycle. Since the charge is billed in advance of the service rendered, the credit must be issued when the fee changes during the billing cycle. The detail credits 138 recognize when a fee billed in advance is changed during the previous bill period. Although the text labels the detail credit 138 as a "monthly service charge", the change is actually in the "number portability surcharge." The detail charges 140 are pulled from the monthly charges information. The total amount of credits and charges 142 is the mathematical total of the fee items shown in the credits and charges section pulled from line items therein. The local, state, and federal charges heading 144 denotes the subsection containing the local, state, and federal charges line items 146, generally specific charges accessed against each subscriber line. The total local, state, and federal charges amount 148 is the mathematical total of the line items in the local, state, and federal line items 146. The taxes heading 150 denotes the subsection containing tax-related information should there be any tax-related information associated with the client account. The tax line items 152 are pulled from customer information, and based on a tax jurisdiction process. The tax jurisdiction process must review all the recurring charges, service charges, and usage charges to identify applicability of the taxes to the fees charged. The decision to apply a tax depends from the preceding analysis of factors such as the taxability characteristics of the client, the transactions that compose the bill, and the taxing jurisdictions that apply to the client. The total taxes amount 154 is a mathematical total of the fee items shown in the tax subsection, wherein the values totaled are pulled from other sections of the bill. The total local service charges amount 156 is a mathematical total of all items in the local service section, therefore, also a mathematical total of all the subsection totals in the same section.

The scanline 158 is a computer-readable sequence of digits that support payment automation. The scanline 158 generally identifies such items as the client account, the amount of balance, the amount due if promptly paid, and the amount due if payment is received after the due date. The postal bar code 160 encodes the zip code information for the payment center designated to receive the payment. The bill payment address 164 indicates the address to which payment should be sent. Typically, the scanline 158, the postal bar code 160, and the bill payment address 164 are designed and positioned on the bill to facilitate computer-scanning and/or viewing via a window in the bill's envelope.

In various embodiments of the present invention, the system includes a billing control application, a billing server application, and client usage data. Typically, the billing server application is loaded into RAM where it remains perpetually available for both interactive and batch use. The billing control application sends instructions to the billing server to process a batch of client accounts. The bill control application and other software applications may send a request to generate a bill for a single client account. The single client account bill request may be an actual bill or a trial bill. If an actual bill is generated, the result of the bill process changes the state of the related data; e.g., previously billed amount necessitating an update to the corresponding data. If a trial bill is generated, the bill is produced without corresponding changes to the relevant data.

It is contemplated that various embodiments of the present invention provide rating, taxing, instant messaging or other services in addition to the bill generation functionality heretofore described.

The rating service generally comprises a software component (hereafter, rating component) that stands alone or interacts with the bill generation processes. The rating component generally comprises, calculates, retrieves or otherwise processes data relating to special number selection rules, local calling area selection rules, standard plan selection rules, rate tables, discount/surcharge tables, time-of-day definitions, calendar definitions and rate line selection rules. For example, the mass customization billing engine receives in an invoice specification 12 that requires, inter alia, credits to a client's account. As part of the credit determination and application process, the rating component retrieves the discount table, and determines that a one-time discount is afforded to a new client. The rating component then pulls the client's account information, checks the status of the account, and, upon finding a status of "new", applies the listed discount amount to the current bill calculation.

It is contemplated that the rating component will rate usage transactions from a variety of services, including wire-line phone calls (local, long distance toll, and international), voice over IP telephony, broadband services, wireless phone calls, cable pay-per-view, utility consumption (electrical, gas, and water), and Internet/data usage transactions. Generally, the units of measure for providing and rating these services are user-defined. The rating component also rates previously-rated transactions on request.

The taxing service generally comprises a software component (hereafter, taxing component) that stands alone or interacts with the bill generations processes. The taxing component generally comprises, calculates, retrieves or otherwise processes data relating to tariff conversions and tax software integration programs. For example, when customers rate telephone calls, tens of thousands of database records are needed to define the telephone destinations. Generally, a provider utilizes tax software integration programs and database records supplied from a database vendor to determine tariffs, etc. The provider utilizes the data supplied from the database vendor to avoid the cost and effort associated with entering and maintaining the data itself.

It is further contemplated that various embodiments of the present invention include the software component or processing steps necessary to process credit/debit information relevant to a client account, bundled services billing; i.e., combined recurring services bundles into one priced item; labor charges for services; estimated or forecast charges; true-ups, i.e., a comparative process to correct charges between an estimated amount and an actual amount for a service; promotional discounts or other premiums; error correction; multiple currency billing services; parallel currency billing services; and support for self-audit or similar procedures.

The foregoing examples represent several of the embodiments of the present invention; however, one skilled in the art will recognize that the invention described herein may be implemented in a variety of ways. Therefore, the foregoing examples should be consider illustrative only, and not a limitation of the present invention.

I claim:

1. A method of providing customized billing services, comprising the steps of:
    providing a plurality of software objects, at least certain of which are capable of accessing an outside source, accessing one or more other software objects, or creating one or more new software objects, each object being operative to acquire and process data specific to a bill or the recipient thereof;
    configuring a subset of the software objects to generate customized bill content for a particular bill recipient;
    repetitively invoking the software objects of the subset, and any software objects that they access or create, until all of the objects have completed the data acquisition and processing actions required to generate the customized bill content; and
    producing a bill by formatting the customized bill content for the particular bill recipient.

2. The method of claim 1, wherein a portion of the customized bill content is correlated to specific fields in the bill format.

3. The method of claim 1, wherein the customized bill content includes detailed information pertinent to a client billing account.

4. The method of claim 3, further comprising the step of segmenting the detailed information into different portions of the bill.

5. The method of claim 1, further comprising the steps of:
    generating separate images from the customized bill content; and
    correlating the separate images to at least two specific fields in the generated bill.

6. The method of claim 5, wherein the separate images further comprise summary information.

7. The method of claim 1, further comprising the steps of:
    selecting a language in which to produce the bill; and
    converting the customized bill content to the selected language prior to generating the bill.

* * * * *